US005522142A

United States Patent [19]
Whited

[11] Patent Number: 5,522,142
[45] Date of Patent: Jun. 4, 1996

[54] ROTARY KNIFE AND SLICING GAUGE

[75] Inventor: Jeffrey A. Whited, Amherst, Ohio

[73] Assignee: Bettcher Industries, Inc., Birmingham, Ohio

[21] Appl. No.: 268,973

[22] Filed: Jun. 30, 1994

[51] Int. Cl.[6] .......................... A22C 17/04; B26B 25/00; B26B 29/00

[52] U.S. Cl. .............................. 30/276; 30/283; 30/293

[58] Field of Search .............................. 30/276, 347, 264, 30/294, 293, 283

[56] References Cited

U.S. PATENT DOCUMENTS

| | | | |
|---|---|---|---|
| 3,269,010 | 8/1966 | Bettcher . | |
| 3,688,403 | 9/1972 | Bettcher | 30/276 |
| 4,175,321 | 11/1979 | Bettcher | 30/276 |
| 4,439,924 | 4/1984 | Bettcher | 30/276 |
| 4,516,323 | 5/1985 | Bettcher et al. | 30/276 |
| 4,575,937 | 3/1986 | Bettcher | 30/276 |
| 5,230,154 | 7/1993 | Decker et al. | 30/276 |

FOREIGN PATENT DOCUMENTS 2238229 5/1991 United Kingdom .

*Primary Examiner*—Douglas D. Watts
*Attorney, Agent, or Firm*—Watts, Hoffmann, Fisher & Heinke Co.

[57] ABSTRACT

A rotary knife for slicing thin strips from comestible product comprising a handpiece, a blade housing removably secured to the handpiece and an annular blade supported for rotation by the blade housing. A rotary driver is carried by the handpiece and engaged with the blade. A power drive is connected to the rotary driver. An annular gauge is detachably secured to the handpiece and blade housing for controlling the thickness of the strips sliced by the knife. The gauge includes a portion substantially concentric with and at least partially encircled by the blade and the blade housing for controlling the depth of cut and an end portion that flares radially outward and is located beyond the axial extent of the blade housing to direct the cut strip. A deflector on the handpiece directs fluid separated from the comestible product in a direction away from the handpiece.

37 Claims, 6 Drawing Sheets

ROTARY KNIFE AND SLICING GAUGE

BACKGROUND OF THE INVENTION

1. Technical Field

The present invention relates generally to a power driven rotary knife for use in slicing relatively thin strips of a comestible product. In particular, the present invention relates to a relatively light weight, hand held and power driven rotary knife having an adjustable gauge for controlling the thickness of a sliced strip of meat and a grease deflector.

2. Description of the Prior Art

So-called fast food marketing has been expanding to include many new foods to appeal to a relatively large customer base. One popular food now being offered is a "gyro", "kabob" or "donner kabob" sandwich which include thin slices of meat cut from composite logs of meat. The logs are typically made from chunks of various meats and/or ground or commutated meat formed into a substantially frusto-conical shape and seasoned. The logs range typically from about six inches to one foot in diameter at the base and about two feet in diameter at the top with a height of eighteen inches to three feet. The logs are supported on a metallic plate in a vertical orientation and are rotated so heat applied from the back of an oven cooks the log to a very limited depth inward from an exterior surface. The front of the oven is open and an operator may slice strips of meat from the exterior surface of the log.

Originally, a slicing operator used a known straight bladed knife to manually cut the strips of meat from the log. A great deal of skill was typically required to cut along the entire length of the exterior surface of the log and to concurrently control the thickness of the strip of meat. Relatively high pay accompanies this high skill level. This was acceptable for restaurant trade, but is slow and expensive for fast food marketing.

Power driven rotary knives have been used to a limited extent to improve the slicing operation. For example, it is understood that a knife similar to that shown in U.S. Pat. No. 4,439,924 has been tried for this purpose. However, the knife was designed for use in meat packing houses, is expensive, relatively heavy for continuous use by personnel who work in fast food restaurants for applications where the meat is sliced from vertically oriented logs for relatively long hours. The knife also requires a cable drive and an extensive installation of a heavy duty electric motor suspended from above to drive the cable which is undesirable for restaurant use, or requires an air motor in the knife handle and a supply of pressurized air which is typically not available at fast food restaurants.

Thickness control gauges, as shown in U.S. Pat. No. 4,516,323, are available for such known rotary knives. However, the construction of such gauges is not satisfactory for the slicing of products such as cooked meat used for gyro sandwiches, for example, because the thin slices from a vertical log would tend to curl back and engage the cutting blade.

Another power driven rotary knife has been proposed for slicing strips of meat from vertically oriented donner kabob meat logs, as disclosed in British Application No. 2 238 229. The knife has a circular blade with a peripheral cutting edge that rotates at one end of a handle about a longitudinal axis of the handle. However, the use of such a knife has disadvantages because it is relatively heavy and must be used at an unnatural wrist orientation.

In addition, the large amount of grease present in the composite meat logs presents problems for a power driven knife and particularly with a rotary annular blade that tends to pick up and carry the grease to the grip handle area rather than letting it run down the log as when a straight hand knife is used. Grease and debris can flow into the drive mechanism of the power driven knife and also onto the handle, making it difficult to hold, thereby increasing the fatigue experienced by the operator. The grease is often hot and any contact with an operator's hand or wrist is undesirable.

Thus, a need exists for a relatively light weight power driven knife that enables control of the thickness of a slice of meat so people of a relatively low skill level may use the knife to efficiently slice meat from a composite log. It is desirable that the knife be easily installed in a fast food restaurant without special installation structures, readily assembled and disassembled for cleaning and blade replacement by unskilled workers, and that it include provision for deflecting grease or other fluid released from the product as the product is sliced. It is also desirable from a production standpoint that the knife can slice when moved in both the downward and upward direction along the surface of vertically oriented log.

SUMMARY OF THE INVENTION

A power driven rotary knife and slice thickness gauge of the present invention overcome the disadvantages associated with prior knives and methods for slicing relatively thin strips of meat from a composite log. The knife of the present invention is relatively light weight, is easy to install, assemble and disassemble, has an adjustable gauge for controlling the thickness of slices so that satisfactory slicing can be achieved by less skilled operators than those using straight hand knives. The knife has deflectors that intercept fluid, such as hot grease from cooked composite meat logs, thereby reducing the likelihood that such fluids will run into the workings of the knife and onto the handle, making it difficult and unpleasant to grip.

In use, the knife of the present invention can be held with the handle in a substantially horizontal orientation tangential to the log and the operator's hand and forearm in a natural position. The knife will cut slices as it is moved both up and down the log without changing the manner in which it is gripped or its general orientation with respect to the log. Use of the knife should provide a savings in the labor cost attributable to an operator using a conventional straight knife, while providing controllably thin slices of product such as meat for use in a gyro sandwich. Also, uniformly thin slices give the appearance to a consumer that a relatively larger amount of the sliced product is in the sandwich and will typically improve the tenderness and assure uniformity.

Thus, for example, not only can a retail outlet that sells gyro sandwiches realize a labor cost savings of about fifty percent due to the ability to use an operator of a relatively low skill level and who is capable of efficient output compared to the cost of a skilled operator using a straight hand knife, but it can also realize a material (meat) savings of about twenty percent in producing the gyro sandwich by providing the appearance of bulk with less meat than a sandwich made with meat sliced with a straight hand knife because of the uniformity and thinness of the slices provided with a knife embodying the present invention.

A rotary knife embodying the present invention comprises a handpiece, a blade housing removably secured to the handpiece, and an annular blade supported for rotation by the blade housing. A rotary driver is carried by the handpiece and is drivingly engaged with the annular blade. A power drive is connected to the rotary driver. An annular gauge is detachably secured to the handpiece and blade housing for controlling the thickness of the strips sliced by the knife.

The gauge includes a tubular shaped portion, which is substantially concentric with and at least partially encircled by the blade and the blade housing. The gauge further includes an end portion flaring radially outward and located beyond the axial extent of the blade housing. The tubular portion has an outer radius of curvature smaller than the inner radius of the annular blade and the blade housing, and has an axial extent greater than the total axial extent of the annular blade and the blade housing. The position of the gauge relative to the cutting edge of the blade is adjustable to control the thickness of slices.

The annular blade includes a cutting edge at one axial end, a ring gear portion at an end axially opposite the cutting edge for driving engagement with the rotary driver and a flange adjacent the ring gear portion for retaining the annular blade in the blade housing. A frusto-conical portion of the annular blade extends from a first diameter at the flange at the cutting edge. The second diameter is less than the first diameter. The cutting edge is axially spaced from the flange in a direction away from the ring gear. The blade housing is annular and is split to permit circumferential and radial expansion for removing and replacing the blade.

The handpiece of the knife includes a handle that is removably attached to a headpiece. The handle is preferably made from a suitable plastic material. The removable attachment between the headpiece and the handle comprises a shaped opening extending axially in one of the headpiece and the handle with a cavity at an end of the opening. A complementary shaped projection extends from the other of the headpiece and the handle for receipt in, and axial movement within, the shaped opening. The projection relatively rotates within the cavity at the end of the opening until a position is reached at which relative movement between said handle and said headpiece is inhibited. The power drive comprises an electric motor supported in the handle.

The knife further includes a deflector for directing fluid, such as hot grease, separated from a workpiece, such as a composite log of meat, in a direction away from the handpiece. The deflector is formed integrally with the handpiece in an arcuate shape and positioned coaxially with and extending axially beyond the cutting edge of the blade to direct grease in a direction away from the handle. The deflector also includes a tab positioned tangentially relative to the blade at a location radially outside the blade housing to direct grease in a direction away from the handle during blade rotation.

The knife further includes a recess in the housing for receiving at least a portion of the rotary driver and enables meshing engagement with the ring gear portion of the blade. A bore is located in the handpiece and receives a tubular bearing. The bearing has a flanged end portion extending axially a predetermined distance outwardly from the bore. An annular recess is formed in an axial end surface of the driving portion of the rotary driver that opposes the end portion of the bearing. The recess receives the axially extending end portion of the bearing so that the rotary driver partially encircles the extending end portion to restrict flow of fluids therebetween.

The rotary driver includes a hollow shaft portion with an axially extending slot defined by a straight axial side surface and an angled side surface. The straight side surface is for driving engagement with a portion of the power drive and the angled side surface is circumferentially displaced from the straight side surface a distance greater than the width of the power drive portion with which it engages to permit relative rotational misalignment of the power drive portion and the slot during relative axial movement of the handle towards the headpiece.

BRIEF DESCRIPTION OF THE DRAWINGS

The above and other features of the present invention will become apparent to those skilled in the art to which the present invention relates from the following specification and the accompanying drawings, in which.

DESCRIPTION OF A PREFERRED EMBODIMENT

Figures 1, 12:
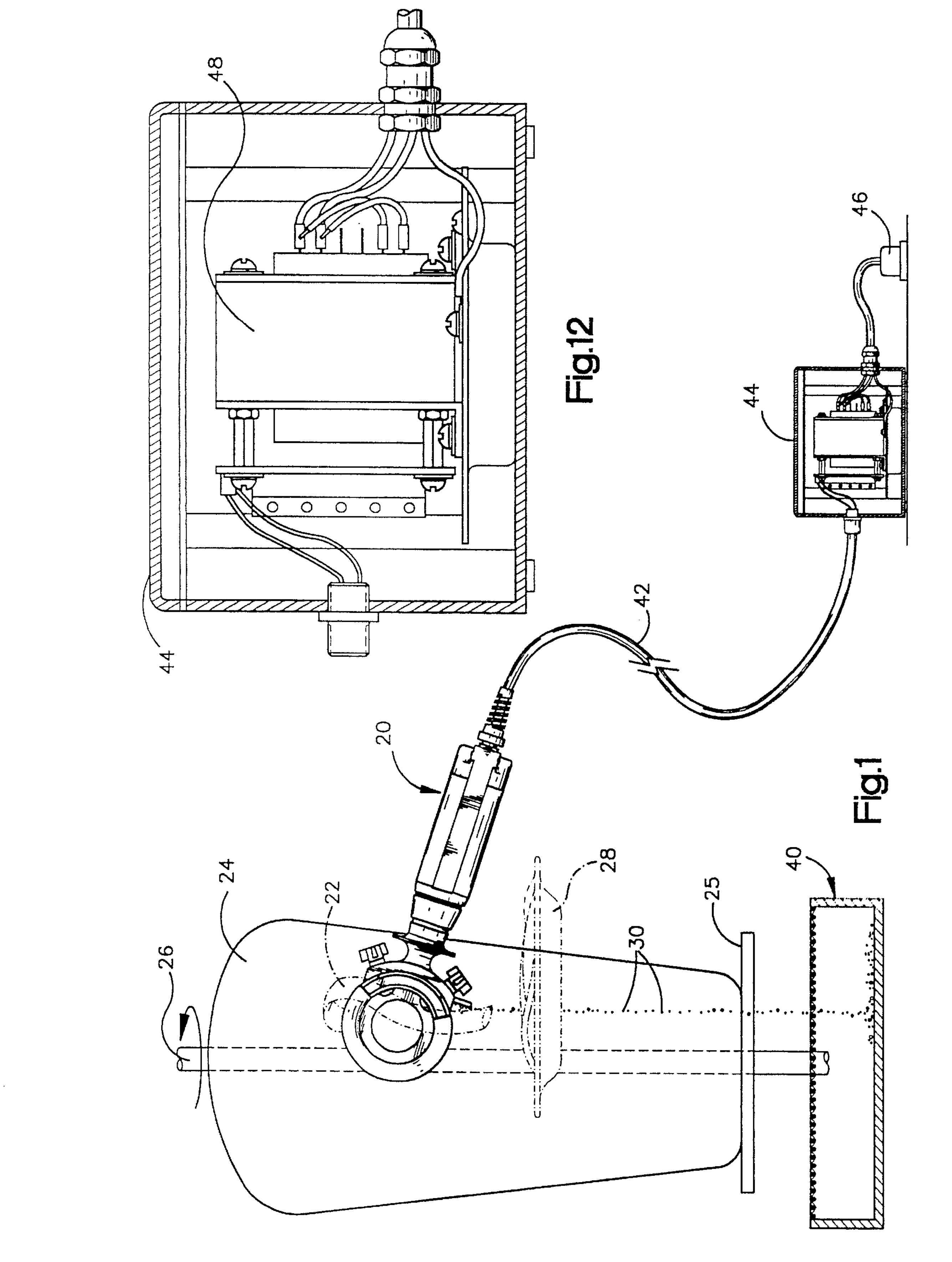
FIG. 1 is a schematic view of a rotary knife, embodying the present invention, cutting a relatively thin strip from a composite log of meat.
FIG. 12 is an enlarged cross-sectional view of the power supply and transformer of FIG. 1.

A light weight and power driven rotary knife 20 (FIG. 1), embodying the present invention, is particularly suitable for use in slicing relatively thin strips 22 of meat from a composite log 24. The log 24 is supported for rotation on a metal plate 25 about a vertical shaft 26 in an oven (not shown). The knife 20 slices a relatively thin strip 22 of meat from the log 24 and directs the strip onto a receptacle 28, such as a plate. A relatively large amount of hot grease 30 is also created by the slicing operation and falls into a collection pit 40 located adjacent the bottom of the log 24.

An electrical cord 42 supplies electrical power from a power supply 44 which is electrically connected to a convenient wall or floor outlet by a plug 46. Having the power supply 44 located remotely from the knife 20 is advantageous because the operator does not have to support the weight of the power supply, which includes a transformer 48 (FIG. 12) for converting, for example, 110 volt AC to 24 volt DC.

The knife 20 (FIGS. 2 and 3) includes a handpiece 62 which comprises an elongated handle 64 and a headpiece 66. The handle 64 and headpiece 66 are preferably made from a relatively light weight plastic material, such as molded polysulfone. A blade housing 84 is removably attached to the headpiece 66. The blade housing 84 supports an annular blade 82 for rotation about its longitudinal central axis A which extends normal to a longitudinal axis L of the handpiece 62 and headpiece 66. The blade 82 and blade housing 84 are preferably made from stainless steel or high carbon steel. A pinion cover 86 (FIGS. 3, 7A and 8) retains the blade housing 84 against the headpiece 66. A ridge 88 (FIG. 7B and 8) is formed in the headpiece 66 and positions the blade housing 84 along the axis A by receipt in a groove 90 (FIG. 8) of the blade housing.

A relatively light weight 24 volt DC electric motor 102 (FIG. 4) is located in the handle 64 of the handpiece 62. The motor 102 provides a rotary driving action to an attached shaft 104. The shaft 104 includes a drive member 106 with tabs 108 extending normal to the shaft. The 24 volt DC motor 102 is particularly desirable because of its relatively constant torque at various rotational speeds.

A rotary driver 120 (FIG. 3) is received in the headpiece 66 and has a stainless steel shaft 120*a* and a nylon gear portion 120*b*. A bore 122 extends longitudinally through the headpiece 66. A bearing 124, preferably made from oil-impregnated bronze, is located within the bore 122 in the headpiece 66. A recess 130 (FIG. 3) is formed in the headpiece 66 in which the gear portion 120*b* of the rotary driver 120 and flanged end portion 126 of the bearing 124 are located. The bearing 124 has a flanged end portion 126 which extends a predetermined distance outwardly of the bore 122 in the headpiece 66. The rotary driver 120 has a recess 128 on its back surface, facing to the right as viewed in FIG. 3, which at least partially receives the outwardly extending flanged end portion 126 of the bearing 124 so the rotary driver is in a partially surrounding relationship with the end of the bearing. This construction serves as a labyrinth seal to inhibit any meat, grease or other debris from entering between the bearing 124 and rotary driver 120.

Figures 4, 5, 6:
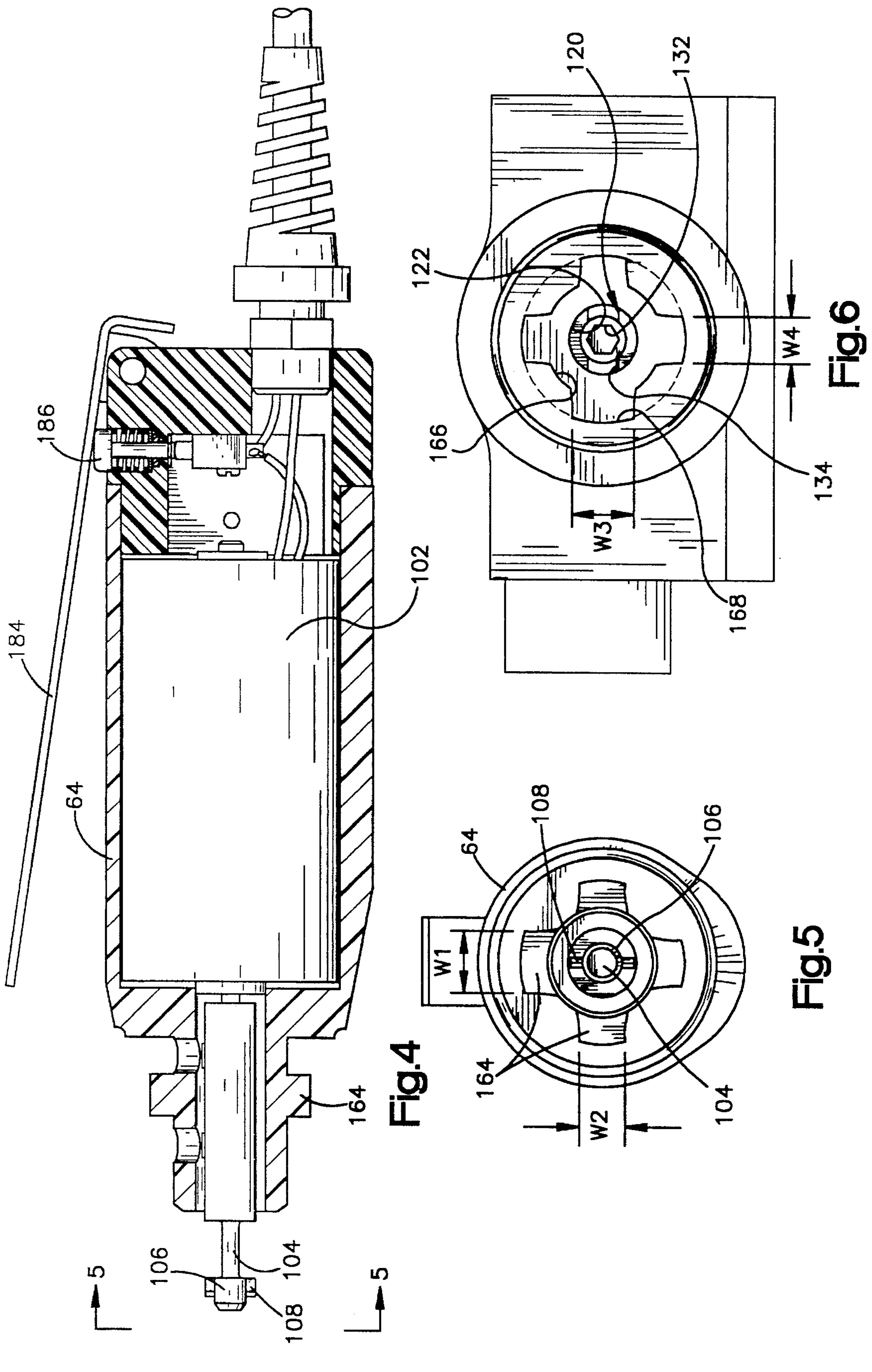
FIG. 4 is an enlarged cross-sectional view of a handle portion of the rotary knife illustrated in FIG. 3.
FIG. 5 is a front view of the handle portion and drive shaft of FIG. 5, taken along line 5—5 in FIG. 4.
FIG. 6 is a rear view of a headpiece portion of FIG. 3, taken approximately along line 6—6 in FIG. 3.

The rotary driver 120 has an opening 132 (FIGS. 3, 6 and 8) which receives a drive shaft 104 (FIG. 4). During axial movement of the drive shaft 104 into the headpiece 66, tabs 108 of a drive member 106 enter an axial extending slot 134 (FIG. 6) in the rotary driver 120 for driving engagement. The tabs 108 of the drive member 106 enter the slot 134 (FIG. 8) at circumferentially spaced locations in the rotary driver 120. The slot 134 is defined by a straight axial side surface 136 and an angled side surface 138. The straight side surface 136 is for driving engagement with a tab 108 of the drive member 106. The angled side surface 138 is circumferentially displaced from the straight side surface 136 a distance greater than the width of the tab 108 to permit relative rotational misalignment of the tab 108 and the slot 134 during relative axial movement of the handle 64 towards the headpiece 66. This drive structure between the drive member 106 and rotary driver 120 allows some relative rotational misalignment therebetween upon assembly of the handpiece 62 because the slots 134 are wider than the width of tabs 108 of the drive member. The tabs 108 engage the axial surfaces 136 of the slots 134 to turn the rotary driver upon rotation of the electric motor 102.

Figure 9:
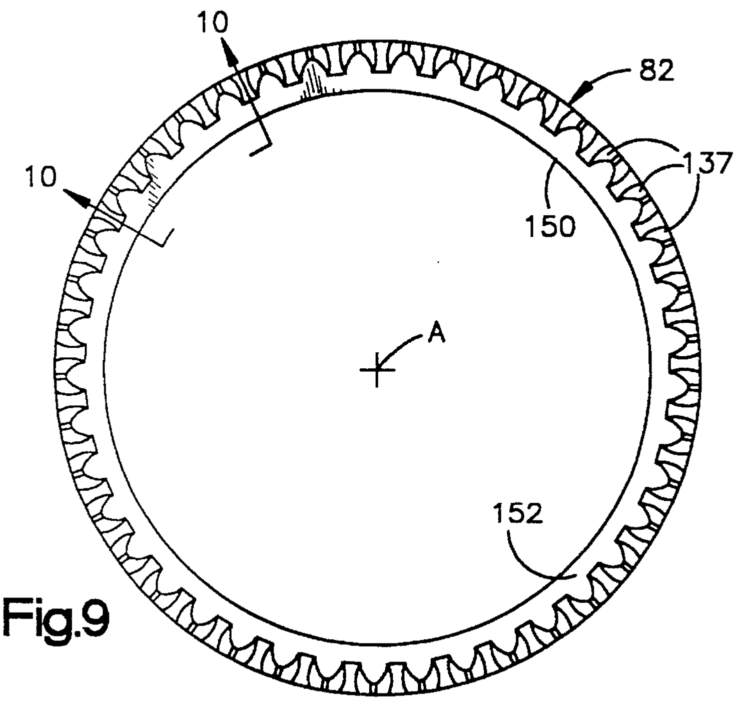
FIG. 9 is a top plan view of the annular blade.
Figure 10:
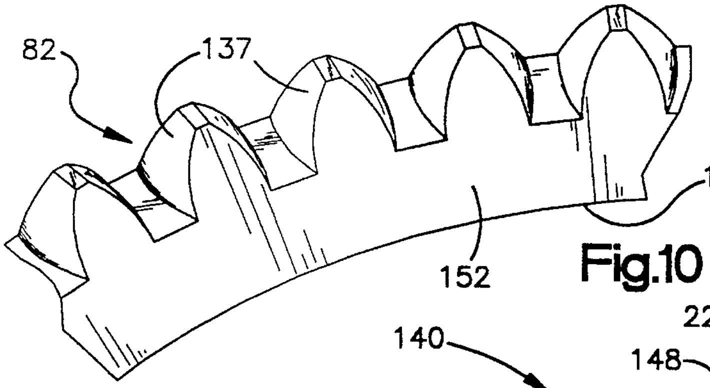
FIG. 10 is an enlarged perspective view of a portion of the annular blade of FIG. 9, indicated by line 10—10 in FIG. 9.

Upon rotation of the electric motor 102, the shaft 104 and the rotary driver 120 turn. The gear portion of the rotary driver 120 meshingly engages with teeth 137 on an upper side, as viewed in FIGS. 3, 9 and 10, of the annular blade 82. The teeth 137 (FIGS. 9 and 10) of the blade 82 taper in a direction parallel to the axis A and are barrel shaped in a direction taken radial of the axis A. Thus, upon rotation of the motor 102, the rotary driver 120 rotates about the axis L and the annular blade 82 is driven to rotate about the axis A (FIG. 8).

A cut thickness gauge 140 (FIGS. 8 and 11) is releasably attached to the handpiece 62 and blade housing 84 and is preferably made from a light weight plastic, such as polysulfone. The gauge 140 is substantially tubular and concentric around most of its outer periphery with the annular blade 82 and the blade housing 84. The gauge 140 has an end surface 142 for engaging the log 24 and controlling the thickness T of the slice 22 of meat. The gauge 140 includes a tubular central portion 144 having an outer diameter DO less than the inner diameter DI of the blade 82. A radiused portion 146 of the gauge 140 is located at the intersection of the end surface 142 and tubular portion 144.

Figure 8:
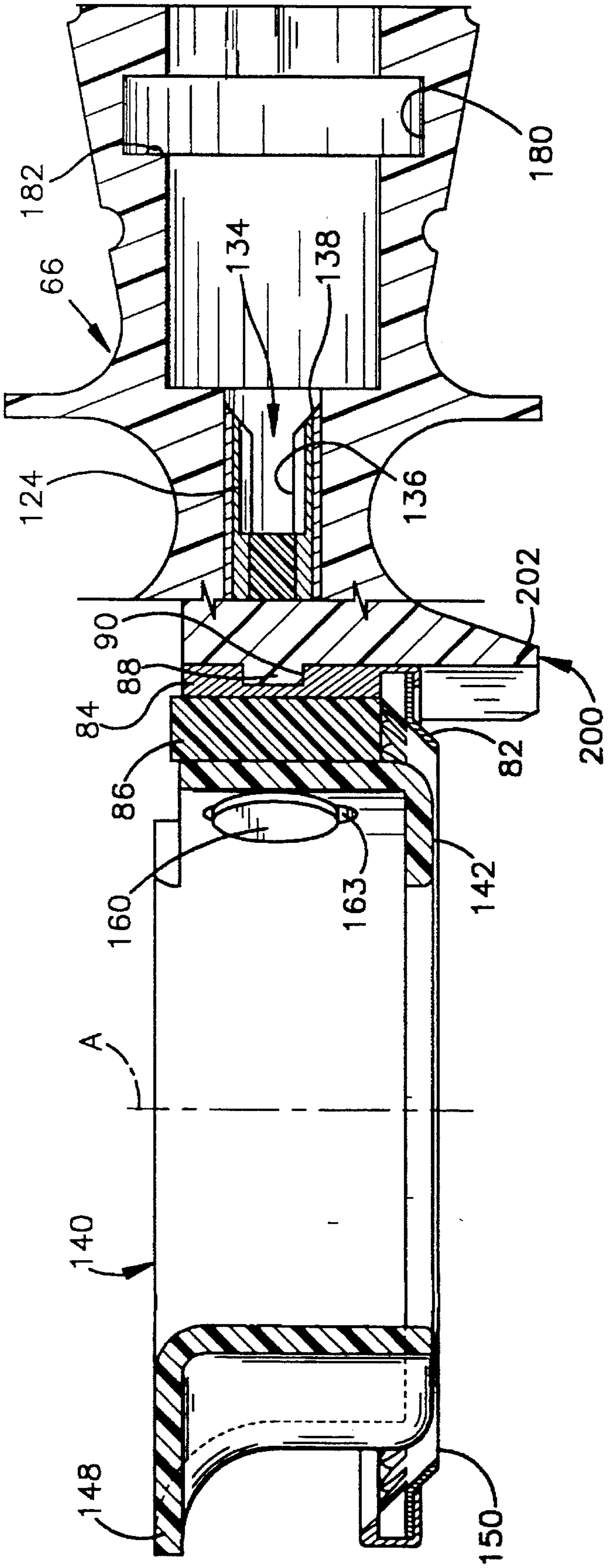
FIG. 8 is a cross-sectional view of a portion of the gauge, blade housing, annular blade and headpiece of FIG. 2, taken approximately along the line 8—8 in FIG. 2.
Figure 11:
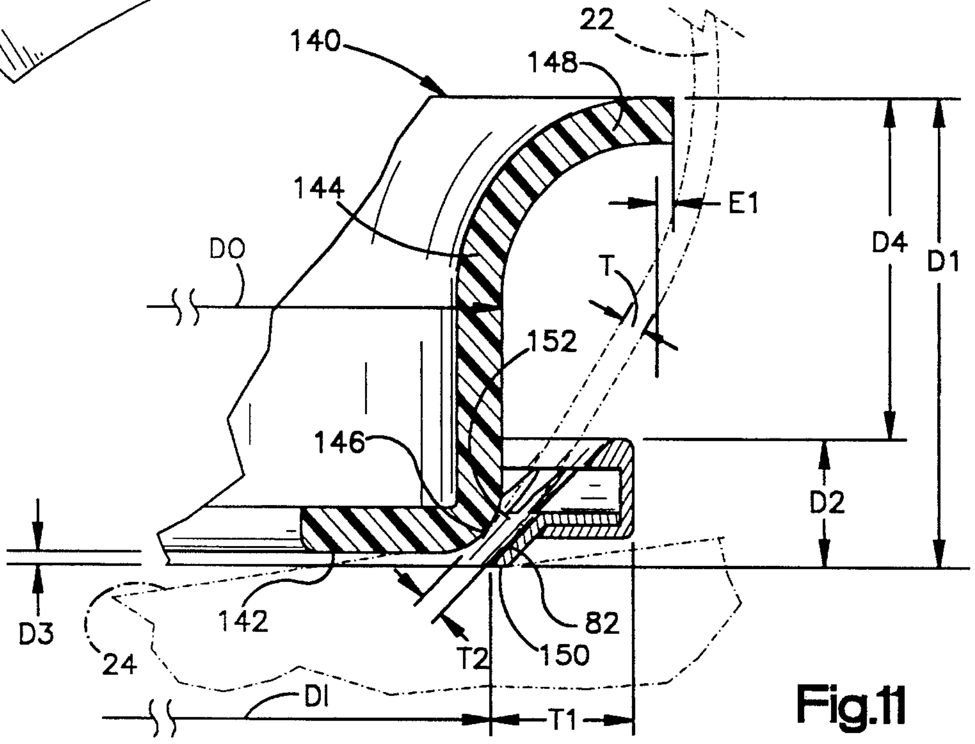
FIG. 11 is an enlarged cross-sectional view of a portion of the gauge, blade housing and annular blade of FIG. 7A during a slicing operation.

The gauge 140 includes a flange 148 formed at least partially around the upper surface of the gauge, as viewed in FIGS. 8 and 11. The flange 148 is located at an axially opposite end of the gauge 140 from the end surface 142. The flange 148 preferably extends radially outward beyond the extent of the blade housing 84 by a distance E1 and deflects or creates a relatively large radius in a slice 22 of meat so that the slice does not enter the central area of the housing and gauge and re-engage the blade 82.

The axial extent or height D1 (FIG. 11) taken in a direction along the axis A of the gauge 140 is substantially greater than the combined axial extent or height D2 of the annular blade 82 and blade housing 84. Preferably, the end surface 142 of the gauge 140 does not extend axially beyond the bottom of a cutting edge 150 of the annular blade 84 and is spaced from the cutting edge an adjustable distance D3, as viewed in FIG. 11. Also, the axial extent of the flange 148 of the gauge 140 preferably extends a relatively considerable distance D4 beyond the upper end of the blade housing 84, as viewed in FIG. 11.

Figure 7A:
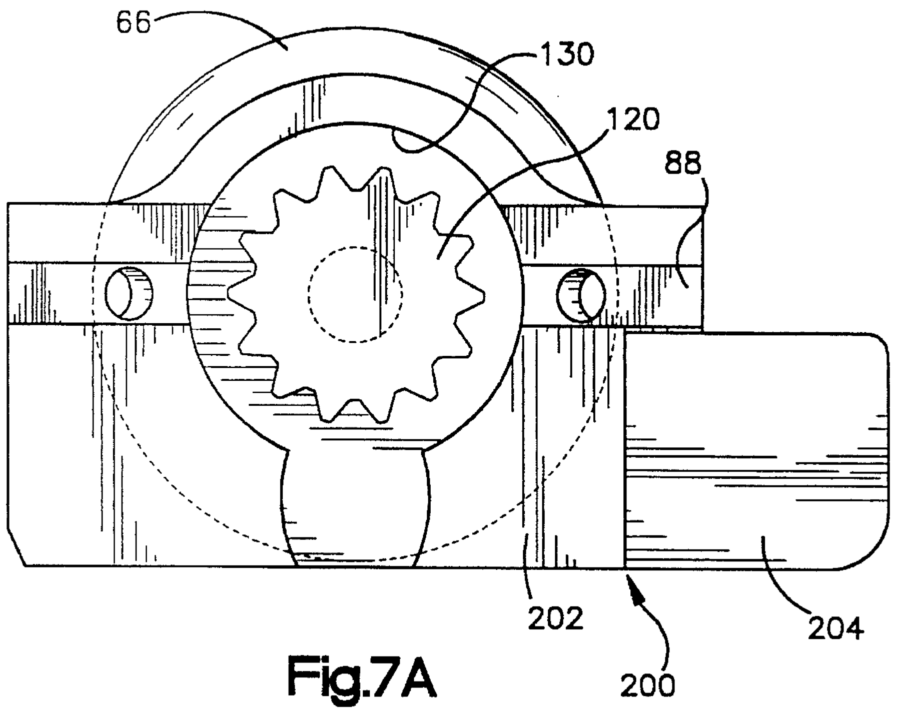
FIG. 7A is an enlarged cross-sectional view of a gauge, blade housing and annular blade of FIG. 3, taken approximately along line 7A—7A in FIG. 3.
Figure 7B:
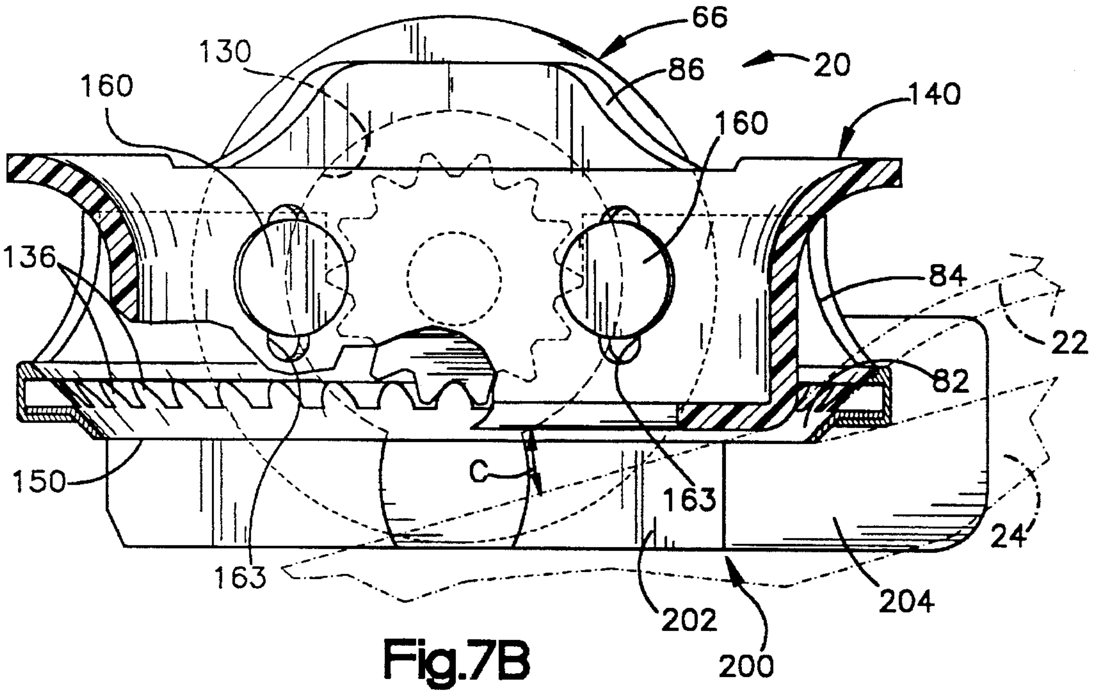
FIG. 7B is an enlarged cross-sectional view of a headpiece of FIG. 3, taken approximately along line 7B—7B in FIG. 3.

An angle C of contact between the knife 20 and arcuate exterior surface of the log 24, as viewed in FIG. 7B, is representative of a typical cutting angle and can vary from the angle shown. Another particular advantage of the knife 20 embodying the present invention is the relatively small combined radial thickness T1 (FIG. 11) of the blade 82 and housing 84. This small radial thickness T1 permits the blade 82 to slice very closely to the bottom of the log 24 that is supported on the metal plate 25 (FIG. 1) by allowing the cutting edge 150 to get relatively close to the plate. A clearance T2 exists between a cutting edge 150 of the annular blade 82 and the radiused edge 146. This clearance T2 essentially establishes the thickness T of the strip 22 of meat, as illustrated in FIG. 11, during a cutting or slicing operation. As the knife 20 slices the strip 22 from the log 24, the end surface 142 of the gauge 140 engages a portion of the exterior surface of the log to prevent the blade 82 from slicing more than a predetermined depth into the log.

As illustrated in FIG. 7A, the gauge 140 is adjustably attached to the headpiece 66 and blade housing 84 by a pair of bolts 160. The blade housing 84 is also attached to the headpiece 66 by the same pair of bolts 160. The blade housing 84 has a split 162 which permits radial and circumferential expansion of the blade housing in order to remove and replace a blade 82. The bolts 160 are secured by wing knobs 165, which can be removed or loosened to remove the housing 84 or to adjust the position of the gauge 140 in a direction along the axis A and relative to the cutting edge 150 of the annular blade 82. The gauge 140 has slots 163 through which the bolts 160 extend. Thus, the position of the gauge 140 relative to the cutting edge 150 of the blade 82 can be adjusted to control the depth of cut into the log 24 and the thickness T of the strip 22 by establishing the clearance T2 between the radiused edge 146 of the gauge and the cutting edge 150 of the blade by setting the distance D3 so that the end surface 142 of the gauge 140 is spaced from the cutting edge of the blade.

Figures 2, 3:
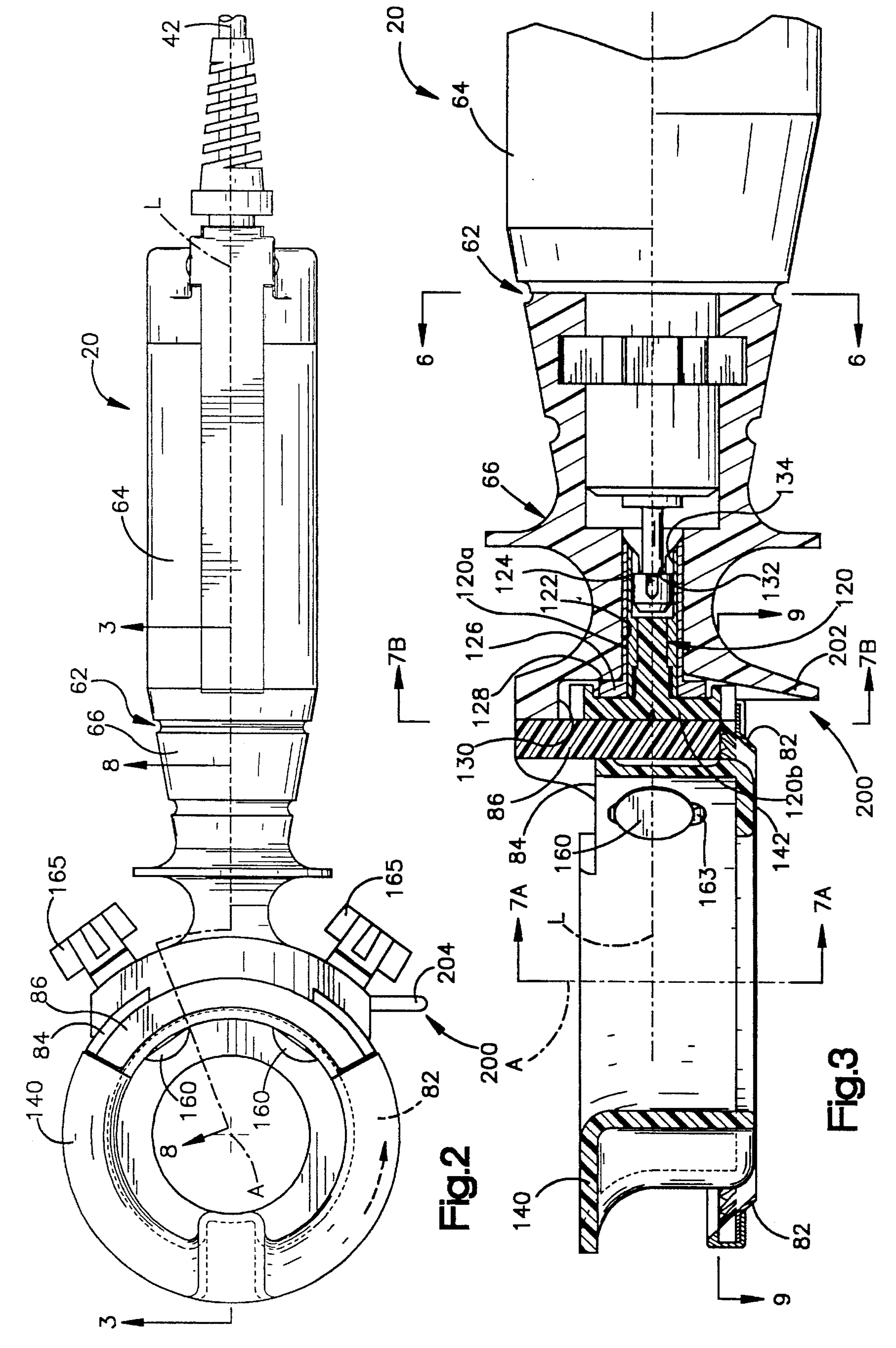
FIG. 2 is a top plan view of the rotary knife of FIG. 1.
FIG. 3 is an enlarged side view, partly in section, of a portion of the rotary knife of FIG. 2, taken approximately along line 3—3 in FIG. 2.

As illustrated in FIG. 3, the removable attachment between the head piece 66 and the handle 64 comprises a bayonet-type connection. That is, the handle 64 and the headpiece 66 are moved axially into engagement and the four tangs 164 (FIGS. 4 and 5) on the handle are rotatably aligned with a cross-shaped opening 166 (FIG. 6). One of the tangs 164 has a width W1 that is slightly wider than the width W2 of the three remaining tangs. A first recess 168 of the opening 166 has a width W3 which is slightly wider than the width W1 of the largest tang 164. The three other recesses 168 of the opening 166 have a width W4 which is slightly wider than the width W2 of the three remaining tangs 164. Thus, rotational alignment is assured between the handle 64 and headpiece 66 so a trigger 184 is not depressed when the knife 20 is placed on a support surface with the blade 82 facing the surface. The trigger 184 (FIG. 4) is provided on the handle 64 to activate a switch 186 by finger or hand pressure in order to actuate the electric motor 102 and rotate the annular blade 82.

When the rotational alignment is realized, the handle 64 and tangs 164 are moved axially inwardly within the opening 166 in the headpiece 66 until a cylindrical cavity 180 (FIG. 8) in the headpiece is reached. The handle 64 is then rotated relative to the headpiece 66 so that the tangs 164 rotate within the cavity 180 until the tangs rotate into frictional engagement with retention structure 182. Frictional engagement with the retention structure 182 maintains the handle 64 axially and rotatably aligned in a desired position relative to the headpiece 66.

The knife 20 further includes a detector 200 (FIGS. 2, 3, 7A, 7B and 8) for directing the hot grease 30 separated from a workpiece, such as the composite log 24 of meat, in a direction away from the handpiece 62. The deflector 200 has a first portion 202 (FIGS. 3 and 8) preferably formed integrally with the headpiece 66 in an arcuate shape and positioned coaxially with and extending axially beyond the cutting edge 150 of the blade 82 to direct grease 30, flowing by gravity or by the force of the blade rotation, in a direction away from an operator's hand during rotation of the blade 82 especially when the handpiece is oriented substantially in a vertical direction. The deflector 200 also includes a tab 204 (FIG. 2) positioned tangentially relative to the blade 82 at a location radially outside the housing 84 to direct grease 30, flowing by gravity or by the force of the blade rotation, in a direction away from an operator's hand during blade rotation especially when the handpiece 62 is oriented in a substantially horizontal direction. The tab 204 is preferably formed integrally with the headpiece 66.

While a preferred embodiment of the invention has been described in detail, it will be understood that various modifications and alterations may be made therein without departing from the spirit and scope of the invention set forth in the appended claims.

I claim:

1. A power driven rotary knife for slicing thin strips of comestible product, said knife comprising:

a handpiece;

a blade housing removably secured to said handpiece;

an annular blade supported for rotation by said blade housing;

a rotary driver carried by said handpiece and engaged with said blade;

a power drive connected to said rotary driver; and an annular gauge detachably secured to said handpiece for controlling the thickness of the strips sliced by said knife, said gauge including a portion substantially concentric with and at least partially encircled by said blade and said blade housing, said gauge further including an end portion flaring radially outward and located beyond the axial extent of said blade housing, said concentric portion having an axial extent greater than the axial extent of said blade and said blade housing.

2. A rotary knife as set forth in claim 1 further including a deflector for directing fluid separated from the comestible product during slicing away from said handpiece.

3. A rotary knife as set forth in claim 1 wherein said handpiece comprises a headpiece that supports the blade housing and an elongated handle removably attached to the headpiece.

4. A rotary knife as set forth in claim 3 wherein said handle and said headpiece are made from a plastic material.

5. A rotary knife as set forth in claim 3 wherein one of the headpiece and handle has a shaped opening extending into a cavity and the other has a complementary shaped projection for receipt and passage through the shaped opening and for rotation within the cavity to a position at which relative movement between said handle and said headpiece is inhibited.

6. The rotary knife as set forth in claim 1 wherein said power drive comprises an electric motor supported in said handpiece.

7. A rotary knife as set forth in claim 1 wherein said annular blade includes a cutting edge at one axial end, a ring gear portion at an end axially opposite from said cutting edge for driving engagement with said rotary driver and a flange adjacent said ring gear portion for retaining said annular blade in said blade housing.

8. A rotary knife as set forth in claim 7 wherein said annular blade includes a frusto-conical portion that terminates in the cutting edge.

9. A rotary knife as set forth in claim 1 wherein said blade housing is annular and is split to permit circumferential and radial expansion for removing and replacing the blade.

10. The rotary knife as set forth in claim 1 further including means for releasably attaching both the housing and the gauge to the headpiece.

11. The rotary knife as set forth in claim 10 wherein said means allows adjustment of the position of the gauge in its axial direction relative to the cutting edge of said blade.

12. A rotary knife as set forth in claim 1 further including a recess in said blade housing for receiving at least a portion of said rotary driver and that permits engagement between the blade and the rotary driver.

13. A rotary knife as set forth in claim 1 further including:

a bore in said handpiece;

a tubular bearing received in said bore, said bearing having an end portion extending axially a predetermined distance from said bore;

an annular recess formed in an axial end surface of said rotary driver that opposes the bearing end portion, said recess receiving the axially extending end portion of said bearing to restrict flow of fluids therebetween.

14. A rotary knife as set forth in claim 1 wherein said rotary driver includes a hollow shaft portion with an axially extending slot defined by a straight side surface and an angled side surface, said straight side surface for driving engagement with a drive member of said power drive, said angled side surface circumferentially displaced from said straight side surface to rotatably align said drive member relative to said rotary driver during relative axial movement of said handpiece towards said blade housing.

15. A gauge for use with a rotary knife and in which the rotary knife has an annular blade with a cutting edge and a housing supporting the blade for rotation, said gauge comprising:

a tubular body having an outer surface with a semi-cylindrical shape;

a first axial end portion of the body located radially inward from said outer surface and locatable beyond a cutting edge of the blade to engage a workpiece and control the depth to which the blade cuts; and a second axial end portion of the body having a flange extending radially outward from said outer surface to direct a portion severed from the workpiece away from the blade of the rotary knife.

16. A gauge as set forth in claim 15 further including means for adjusting the position of said gauge relative to the housing of the rotary knife in a direction along the central axis of the body.

17. A gauge as set forth in claim 16 wherein the first axial end portion has a radiused outer edge.

18. A gauge as set forth in claim 15 wherein said body has an axial length greater than the combined axial length of the housing and annular blade.

19. A rotary knife comprising:

a handpiece;

a blade housing removably secured to said handpiece;

an annular blade supported for rotation by said blade housing;

a rotary driver carried by said handpiece and engaged with said blade;

a power drive connected to said rotary driver;

a deflector for directing fluid carried by the blade away from said handpiece; and an annular gauge detachably secured to said handpiece for controlling the thickness of strips sliced from a workpiece by said knife, said gauge including a portion substantially concentric with and at least partially encircled by said blade and said blade housing and further including an end portion flaring radially outward and located beyond the axial extent of said blade housing, said concentric portion having an axial extent greater than the axial extent of said blade and said blade housing.

20. A power driven rotary knife for slicing thin strips of comestible product, said knife comprising:

a handpiece;

a blade housing removably secured to said handpiece;

an annular blade supported for rotation about an axis by said blade housing;

a rotary driver carried by said handpiece and engaged with said blade; and, a light weight slice thickness gauge secured to said handpiece, said gauge comprising a thin side wall disposed within the blade annulus and axially spaced flanges extending generally radially from said side wall, said side wall circularly curved about said axis and extending concentrically with respect to at least part of said blade, said side wall extending in the direction of said axis away from said blade to a location beyond said blade housing.

21. The knife claimed in claim 20 wherein said side wall is generally cylindrically curved.

22. The knife claimed in claim 21 wherein one of said flanges is disposed at said location beyond said blade housing.

23. The knife claimed in claim 22 wherein the other of said flanges joins said side wall adjacent said blade.

24. The knife claimed in claim 23 wherein said side wall forms an annulus with said flange at said location beyond the said blade extending radially outwardly from said side wall and said flange adjacent said blade extending radially inwardly from said side wall.

25. The knife claimed in claim 20 further comprising a slice gauge adjustment member for detachably securing said slice gauge to said handpiece, said adjustment member supported for movement relative to said handpiece and said slice gauge for enabling said slice gauge to be secured to said handpiece at any one of a plurality of locations spaced apart in the direction of extent of said axis.

26. A rotary knife comprising:

a handpiece;

a blade housing removably secured to said handpiece;

an annular blade supported for rotation by said blade housing;

a rotary driver carried by said handpiece and engaged with said blade;

a power drive connected to said rotary driver; and a deflector adjacent said blade housing formed integrally with said handpiece in an arcuate shape and positioned coaxially with and extending axially beyond a cutting edge of said annular blade to direct grease away from said handpiece.

27. A rotary knife comprising:

a handpiece;

a blade housing removably secured to said handpiece;

an annular blade supported for rotation by said blade housing;

a rotary driver carried by said handpiece and engaged with said blade;

a power drive connected to said rotary driver; and a deflector attached to said handpiece adjacent said blade housing for directing fluid carried by the blade away from said handpiece, said deflector comprising a tab located substantially tangential of said annular blade and extending radially beyond said blade housing and said annular blade.

28. A rotary knife comprising:

a handpiece;

a blade housing removably secured to said handpiece;

an annular blade supported for rotation by said blade housing;

a rotary driver carried by said handpiece and engaged with said blade;

a power drive connected to said rotary driver;

a deflector attached to said handpiece adjacent said blade housing for directing fluid carried by the blade away from said handpiece;

said hand piece defining a bore and further comprising a tubular bearing received in said bore, said bearing having an end portion extending axially a predetermined distance from said bore; and, an annular recess formed in an axial end surface of said rotary driver that opposes the bearing end portion, said recess receiving the axially extending end portion of said bearing to restrict the flow of fluids therebetween.

29. A rotary knife comprising:

a handpiece;

a blade housing removably secured to said handpiece;

an annular blade supported for rotation by said blade housing;

a rotary driver carried by said handpiece and engaged with said blade;

a power drive connected to said rotary driver;

a deflector attached to said handpiece adjacent said blade housing for directing fluid carried by the blade away from said handpiece; and, a gauge attachable to said housing and adjustable in a direction parallel to the longitudinal central axis of said annular blade to control the thickness of a slice that the annular blade can cut, wherein said gauge further comprises a tubular portion with an outside diameter less than the inside diameter of a cutting edge of said annular blade, a radiused edge between one axial end surface and said tubular portion, said tubular portion diameter sized to define a clearance between said cutting edge and said radiused edge to establish the thickness of a slice that the blade can cut, said end surface extending radially inward of said radiused edge.

30. A rotary knife as set forth in claim 29 wherein said gauge further includes a flange at an axial end opposite said radiused edge and extending radially outward of said tubular portion, said flange located axially beyond said blade housing in a direction opposite the cutting edge of said annular blade to direct sliced strips away from said annular blade.

31. A rotary knife as set forth in claim 28 wherein said rotary driver includes a hollow shaft portion with an axially extending slot defined by a straight side surface and an angled side surface, said straight side surface for driving engagement with a drive member of said power drive, said angled side surface circumferentially displaced from said straight side surface to rotatably align said drive member relative to said rotary driver during relative axial movement of said handpiece towards said blade housing.

32. A rotary knife as set forth in claim 31 further including a recess in said blade housing for at least partially receiving the drive portion of said rotary driver to enable engagement of said rotary driver with a driving edge of said annular blade.

33. A rotary knife as set forth in claim 28 wherein said handpiece comprises a headpiece that supports the blade housing and an elongated handle removably attached to the headpiece.

34. A rotary knife as set forth in claim 33 wherein one of the headpiece and handle has a shaped opening extending into a cavity, and the other has a complementary shaped projection for receipt and passage through the shaped opening and for rotation within the cavity to a position at which relative movement between said handle and said headpiece is inhibited.

35. A rotary knife as set forth in claim 28 wherein said power drive comprises an electric motor supported in said handpiece.

36. A rotary knife as set forth in claim 28 wherein said annular blade includes a cutting edge at one axial end, a ring gear portion at an end axially opposite from said cutting edge for driving engagement with said rotary driver and a flange adjacent said ring gear portion for retaining said annular blade in said blade housing.

37. A rotary knife in claim 36 wherein said ring gear portion includes a plurality of gear teeth having a tapering barrel face shape.

* * * * *